United States Patent [19]
Epperson

[11] 3,924,828
[45] Dec. 9, 1975

[54] PAN, TILT AND ROLL TRIPOD HEAD
[76] Inventor: Victor R. Epperson, 2545 Havencrest Drive, Fallbrook, Calif. 92028
[22] Filed: Dec. 23, 1974
[21] Appl. No.: 535,724

[52] U.S. Cl. .............................. 248/179; 248/278
[51] Int. Cl.² ........................................ F16M 11/12
[58] Field of Search .......... 248/179, 183, 184, 185, 248/186, 276, 278, 279, 282, 283, 284, 285, 286, 289, 291

[56] References Cited
UNITED STATES PATENTS

| | | | |
|---|---|---|---|
| 1,012,383 | 12/1911 | Lyhne | 248/278 X |
| 2,520,884 | 8/1950 | Laube | 248/278 X |
| 2,556,598 | 6/1951 | Rasine | 248/179 |
| 2,802,633 | 8/1957 | Moore | 248/179 |
| 2,886,276 | 5/1959 | Epperson | 248/183 |
| 3,423,056 | 1/1969 | Welt | 248/185 X |

Primary Examiner—Roy D. Frazier
Assistant Examiner—Lawrence J. Staab
Attorney, Agent, or Firm—Brown & Martin

[57] ABSTRACT

A pan-tilt tripod head with the added capability of rolling to either side to provide vertical or horizontal format for the camera. A single trigger controls all motion, the initial trigger squeeze releasing a clamp to allow pan and tilt motion, and a further trigger squeeze releasing a friction lock which allows the head to be rolled to either side. The trigger is mounted on a handle extended from the head for ease of control and the unit is adaptable to standard tripod and camera mounting attachments.

3 Claims, 7 Drawing Figures

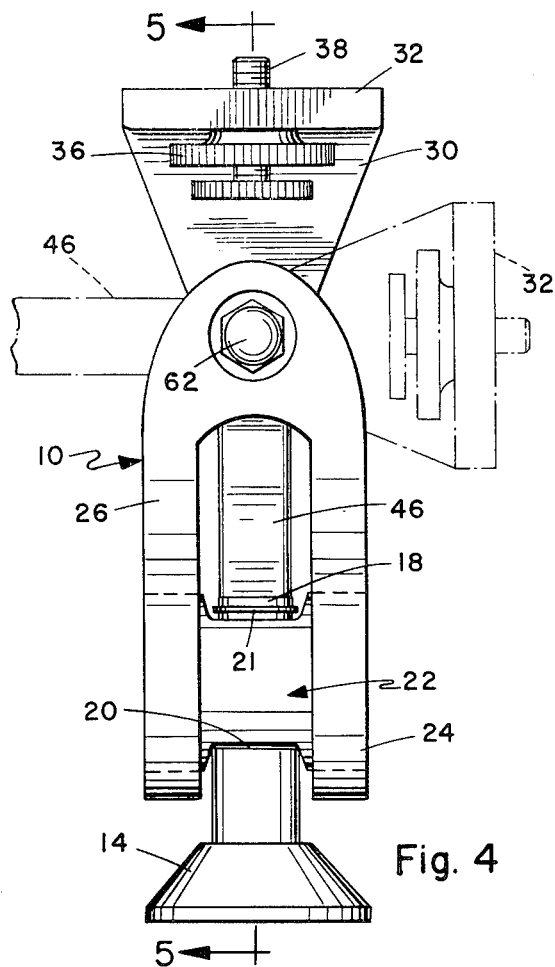
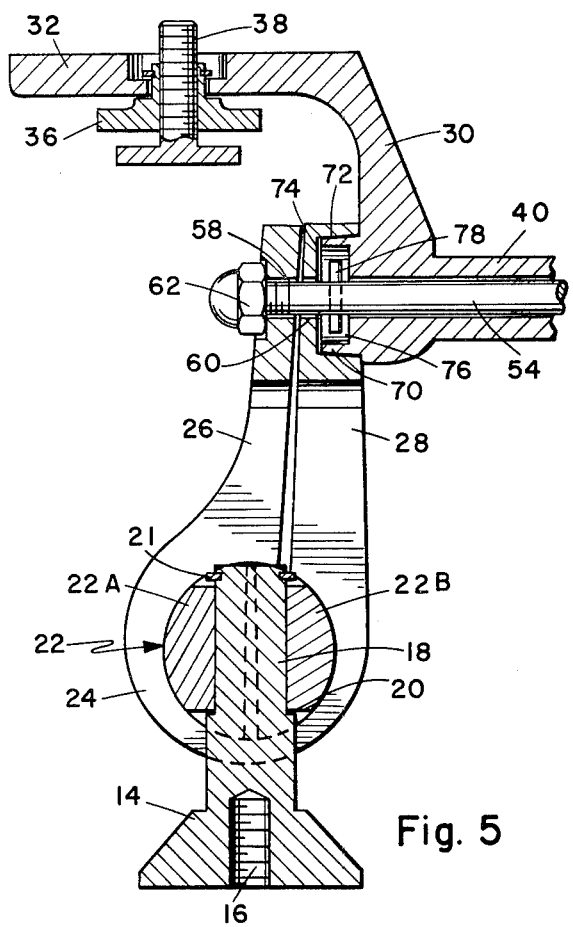
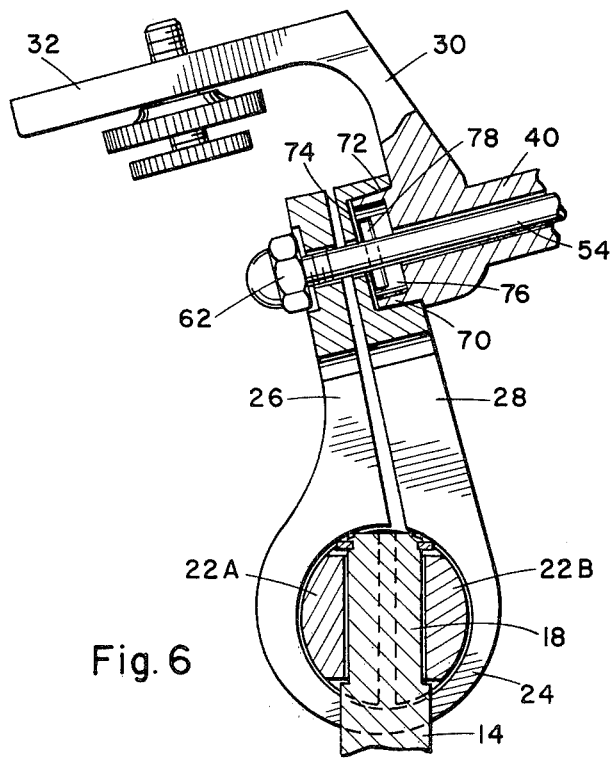
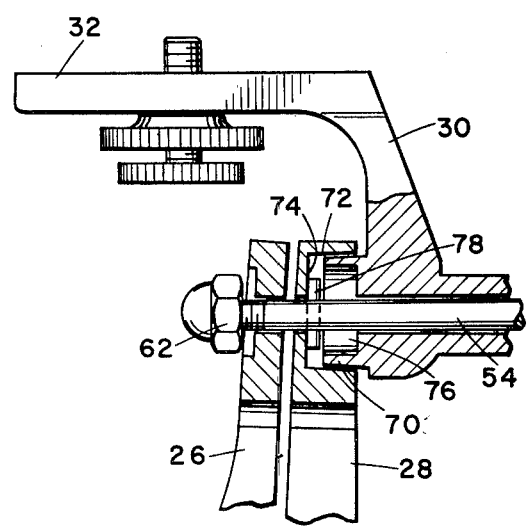

PAN, TILT AND ROLL TRIPOD HEAD

BACKGROUND OF THE INVENTION

Cameras and similar optical instruments are usually mounted on a tripod or other support by means of a head having controls for rotating or panning about a vertical axis and for tilting about a horizontal axis. Various types of clamps, locks and the like are used to hold the head in a set position, some having variable friction to allow smooth motion for following a moving subject or scanning a scene. Some have separate controls for each axis of motion, while others have combined controls. One problem with combination controls is that the entire head becomes loose and difficult to handle when the lock is released.

In using a camera with a rectangular film format, it is sometimes desirable to change between horizontal and vertical format. This requires an additional pivotal mounting on the pan-tilt head, or a complex arrangement with multiple controls.

SUMMARY OF THE INVENTION

The tripod head described herein is capable of panning, tilting and rolling to either side about three orthogonal axes, with all locking controlled by a single trigger on an extended pistol grip type handle. An initial squeeze of the trigger releases a clamp to allow pan and tilt motion about two orthogonal axes, the trigger mechanism having a long lever arm for fine control of friction, which allows smooth motion without looseness in the mounting. Further squeeze action of the trigger, beyond that needed for pan and tilt motion, breaks a friction lock and allows the head to be rolled to either side to change the film format position. When the trigger is fully released, the head is again locked in place.

The structure is simple with a minimum of parts and the unit is adaptable to existing tripod and camera mountings and attachments.

The primary object of this invention, therefore, is to provide a new and improved pan, tilt and roll tripod head.

Another object of this invention is to provide a new and improved tripod head having a single control for all motion.

Another object of this invention is to provide a new and improved tripod head having a secure lock for the roll motion, which is released by control action beyond that needed for pan and tilt motion.

A further object of this invention is to provide a new and improved pan, tilt and roll head which can be used with a variety of existing photographic and other optical equipment.

Other objects and advantages will be apparent in the following detailed description, taken in conjunction with the accompanying drawings, in which:

FIG. 4 is a front view of the unit, as taken from the left hand side of FIG. 1.

FIG. 5 is a sectional view taken on line 5—5 of FIG. 4.

FIG. 6 is a sectional view similar to FIG. 5, showing release of the clamp for pan and tilt motion.

FIG. 7 is a sectional view similar to a portion of FIG. 5, showing release of the frictional lock for roll motion.

DESCRIPTION OF THE PREFERRED EMBODIMENT

Figure 1:
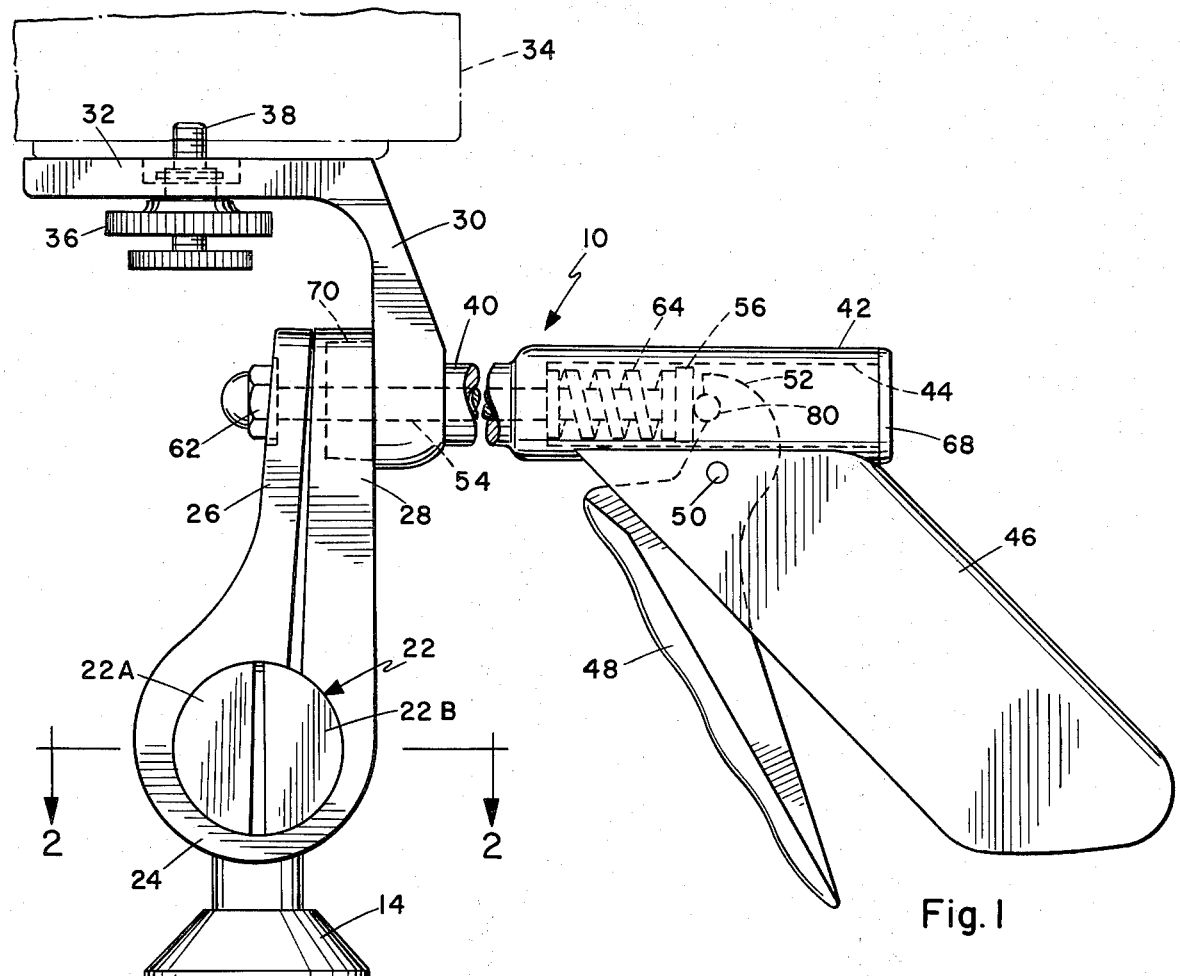
FIG. 1 is a side elevation view of the complete head unit.
Figure 2:
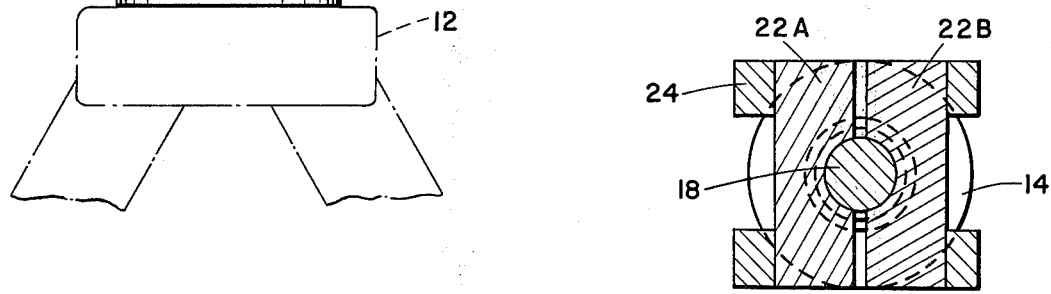
FIG. 2 is a sectional view taken on line 2—2 of FIG. 1.
Figure 3:
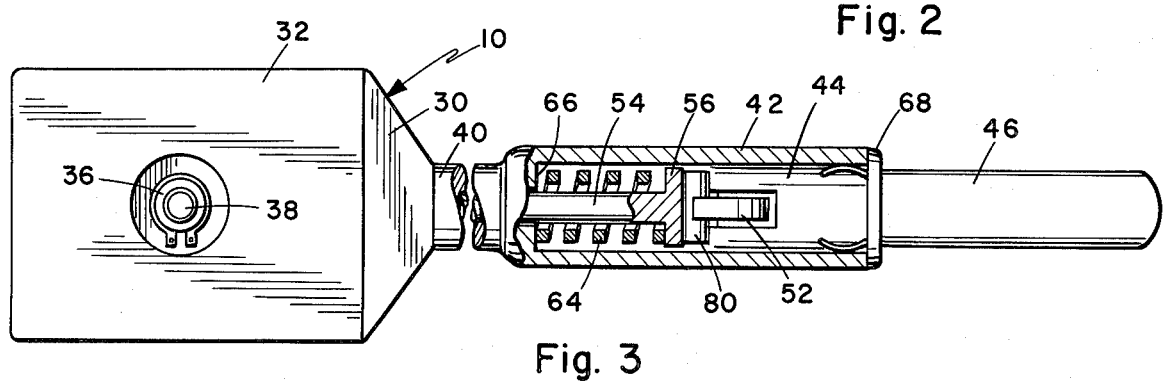
FIG. 3 is a top plan view of the unit, with portions cut away.

The head unit 10 is attached to a conventional tripod 12 by means of a base 14, which has a threaded socket 16 to receive the existing stud or screw of the tripod. Base 14 has an upright pan post 18, about which the head assembly swings for panning motion, the lower end of the post having a shoulder 20 to support the assembly.

Rotatably mounted on post 18 is a cylindrical tilt trunnion 22, which rests on shoulder 20 and is retained by a lock ring 21, the trunnion having its axis horizontal, or perpendicular to the axis of the post. Trunnion 22 is diametrically split into two trunnion halves 22A and 22B, with a small clearance between the halves to allow clamping on the post 18. Journalled on the ends of trunnion 22 is a forked clamp bracket 24, which is split substantially radially and has extended, generally parallel arms 26 and 28 with a separation between the arms.

A head bracket 30 is attached to the upper or outer ends of arms 26 and 28, the head bracket having a platform 32 on which a camera 34 is mounted. As illustrated, a conventional type of camera attachment is used, comprising a lock nut 36 rotatably held in the platform, with a retaining screw 38 threaded through the lock nut to screw into the existing camera socket. Any other suitable means may be used on the platform to hold a camera or other optical instrument.

Projecting from head bracket 30 is an extension arm 40, on the end of which is a cylindrical barrel 42 with an internal bore 44. A pistol grip type handle 46 is fixed to barrel 42 and carries a trigger 48 pivotally mounted on a pin 50. The upper end of trigger 48 has a pawl 52 which projects into bore 44. Axially slidably mounted through extension arm 40 is a clamp rod 54, which extends into bore 44 and has an enlarged flange 56 on that end. The other end of clamp rod 54 passes through coaxial holes 58 and 60 in the arms 26 and 28, respectively, and is secured by a clamp nut 62 bearing on the outer face of arm 26. Clamp rod 54 is biased by a spring 64 between flange 56 and the inner end wall 66 of bore 44, so that clamp nut 60 is pulled firmly against arm 26.

This clamping action pulls arms 26 and 28 together and tightens clamp bracket 24 on trunnion 22. In turn, this clamps trunnion halves 22A and 22B on post 18. Thus the spring holds the assembly against tilt and pan motion by the combined clamping action of the bracket and trunnion. A suitable snap-in end cap 68 is used to close the outer end of bore 44 to protect the mechanism.

Head bracket 30 has a cylindrical plug 70 on the opposite side to and coaxial with extension arm 40. Plug 70 fits into a socket 72 in arm 28, the plug and socket having a corresponding taper converging slightly toward the inner end wall 74 of the socket. The pressure of spring 64 thus jams plug 70 tightly into socket 72 and locks the head bracket normally upright. Plug 70 has a counterbore 76 to accommodate a release pin 78 fixed diametrically through clamp rod 54. In the normal motion of the clamp rod for releasing the clamps for pan and tilt action, the counterbore 76 provides clearance for limited axial movement of the release pin 78.

Trigger 48 has a roller pin 80 attached to pawl 52 for smooth engagement with the outer face of flange 56. When the trigger is squeezed, spring 64 is compressed and clamp rod 54 moves axially to release the pressure of clamp nut 62 from arm 26, as in FIG. 6. This allows arms 26 and 28 to separate, releasing the clamping pressure on trunnion 22 and facilitating tilt motion of the head. Clamping pressure on the trunnion is also released, allowing the trunnion halves to separate for rotation about post 18 in panning motion. By controlling pressure on trigger 48, sufficient friction can be retained in the clamp structure for smooth motion without looseness. The long lever arm of the trigger and the convenient pistol grip handle 46 on its extension arm 40 provide positive control of the motions. When trigger pressure is released, the spring 64 sets the clamps and the head is locked in the selected position.

To roll or rotate the head to either side for changing the film format relative to the subject, the trigger is squeezed beyond the position necessary for releasing the claamps. As illustrated in FIG. 7, this forces release pin 78 against the wall 74 of socket 72 and lifts the plug 70 out of the socket. With the frictional grip of the tapered plug and socket broken, the head can be rolled to either side, as in the broken line position in FIG. 4. The extended handle enables the operator to retain control over the motion of the head while all clamps are loose. As soon as the trigger pressure is released, spring 64 seats plug 70 back into socket 72 and locks the head bracket in the new position.

The actions are thus sequential, with freedom for pan and tilt motion about two orthogonal axes occurring first. Release of the head for roll motion requires a positive effort well beyond that needed for pan and tilt motion, and will not occur accidentally in normal use. The roll motion lock is established as soon as trigger pressure is fully released. Full control of the head is thus maintained by one hand.

Having thus described my invention, I claim:

1. A pan, tilt and roll tripod head, comprising:
   a base having means for attachment to a tripod, said base having an upright post thereon;
   a cylindrical, diametrically split trunnion rotatably mounted on said post for panning motion about one axis;
   a clamp bracket journalled on said trunnion for tilt motion about another axis perpendicular to the post, said clamp bracket being split and having extended, normally separated arms;
   a head bracket pivotally mounted on the end of said arms remote from the trunnion for motion about a roll axis orthogonal to the pan and tilt axes;
   frictional locking means including a substantially cylindrical plug on said head bracket, and a socket in one of said clamp bracket arms to receive the plug, said plug and socket having a corresponding axial taper converging to the inner end of the socket;
   clamp means including a clamp rod passing through said plug and said clamp bracket arms and having a clamp nut bearing against the other of said arms, and a spring coupled to the clamp rod to bias said arms together and lock said plug frictionally into said socket;
   a trigger connected to said clamp rod for axial movement of the clamp rod against said spring to release clamping pressure on said clamp bracket;
   and locking release means between said head bracket and said clamp bracket, operable by movement of the clamp rod beyong that required to release clamping pressure on the clamp bracket, to unlock the plug from frictional grip in the socket.

2. A pan, tilt and roll tripod head according to claim 1, wherein,
   said plug has a counterbore therein, said locking release means comprising a release pin fixed in said clamp rod and enclosed in the counterbore, said release pin having clearance in the counterbore for axial motion of the clamp rod while releasing said clamp means, and to bear against the inner end of said socket and break the frictional lock of the plug and socket when the clamp rod is moved beyond the normal clamp release position.

3. A pan, tilt and roll tripod head according to claim 2 wherein,
   said head bracket has an extension arm with a handle thereon, said trigger being mounted in said handle, said clamp rod being axially slidable through said extension arm and being connected to the trigger.

* * * * *